Figure 1:
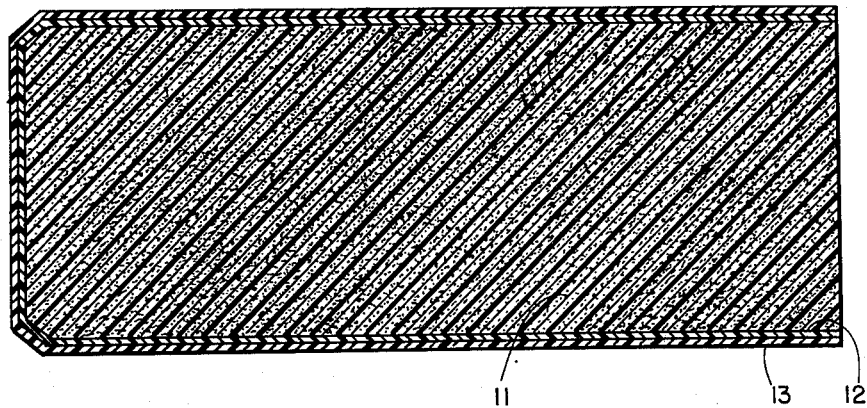

Feb. 12, 1957    R. L. HIRSCH ET AL    2,780,996
ROCKET PROPELLANT CHARGE AND LINER THEREFOR
Filed Oct. 28, 1947

INVENTORS
ROBERT L. HIRSCH
CLYDE F. MILLER
ANTHONY BELLIN
BY
Christie and Angus
ATTORNEYS

United States Patent Office 2,780,996
Patented Feb. 12, 1957

2,780,996

ROCKET PROPELLANT CHARGE AND LINER THEREFOR

Robert L. Hirsch, Glendale, Clyde F. Miller, Arcadia, and Anthony Bellin, Pasadena, Calif., assignors, by mesne assignments, to Aerojet-General Corporation, Cincinnati, Ohio, a corporation of Ohio Application October 28, 1947, Serial No. 782,608

9 Claims. (Cl. 102—97)

This invention relates to propellants of the solid type used in rocket motors and the like; and more particularly it relates to such propellants compounded from an alkyd resin base.

The principal object of the invention is to bond a liner to the walls of such a propellant charge, so as to prevent burning between the liner and the wall and to restrict the burning to surface of the charge which are uncovered by the liner.

It has heretofore been a practice to form a solid propellant charge, in the shape of a stick, and then fit it within the chamber of the rocket or motor. This is commonly done, for example, by casting the propellant in a suitable mold. When such a propellant charge or stick is placed within the chamber of the motor, burning would ordinarily occur not only on the surface of the stick which is intended to burn, but also between the sides of the stick and the wall of the chamber. This gives rise to uncontrolled burning with indeterminately high pressures and danger to the motor. To avoid such undesired unrestricted burning around the sides of the propellant stick, a coating or liner has been applied by bonding to it a material which adheres to the propellant, thereby preventing access of flame or hot gases to the sides of the propellant stick. Propellant charges thus coated are commonly called restricted charges because the burning is thus restricted to surfaces which are uncoated.

It is desirable in some rocket motor applications to use a propellant charge having an alkyd resin base, for example, a charge compounded from inorganic perchlorates suspended in alkyd resin matrices. In the case of such charges having an alkyd resin base, difficulty has been experienced in providing a liner which binds itself with sufficient tenacity to the surface of the cured thermosetting alkyd-vinyl resin.

Furthermore, the application of previously known liners to alkyd base propellants has not usually permitted such alkyd resin base propellant charges to experience the very wide temperature range of which it is otherwise capable, without cracking. A great advantage of the use of an alkyd resin base charge is that it is capable of withstanding very low temperatures and very high temperatures without cracking and it is desired that the liner shall have the same desirable temperature range without cracking.

In accordance with our invention we have discovered that a material eminently suitable for a liner for alkyd resin base propellant charges is one compounded from a mixture of thermoplastic resins; one of the resins in the mixture being a non-drying alkyd resin formed in general by condensing a polyhydric alcohol, such as glycerol, glycol, polyglycol, polyglycerol, pentaerythritol, hexitol and propane, 1,2-diol, with a polycarboxylic acid, such as sebacic, adipic, maleic, phthalic, etc., which may, if desired, be modified with a saturated fatty acid, or acids of low degree of unsaturation, or a natural non-drying oil; and the other resin in the mixture being a polyamide polymerization product formed by the condensation of dimerized or trimerized linoleic or linolenic acid with ethylene diamine or other liquid aliphatic diamines such as, for example, trimethylene diamine. Such resin mixtures as these are thermoplastic and can be melted and applied to the propellant charge by dipping the charge in the resin mixture while the resin is melted. The charge can be left in long enough to allow a substantial layer to build up to a desired thickness around the walls of the charge which are to be thus restricted, and then the charge can be withdrawn from the molten bath. When the material adhering to the surfaces has cooled, it solidifies and forms a basic coating closely adherent to the charge. If desired, a second or third or other dippings may be provided to obtain a thicker layer.

The outer surface of the liner thus formed may, if desired, be protected by a suitable covering such as a glass tape or a sticky cloth tape, as particular conditions may indicate.

A liner so formed possesses good tensile properties at very low temperatures such as −30° F. and lower, and still possesses sufficient strength and adherence to the charge even though the charge and liner be subjected to temperatures as high at 150° F. and up.

Owing to the close adherence and tenacity of the layer even under extreme heat, undesired burning irregularities are minimized or substantially prevented along the surfaces of the alkyd resin type charge, in the presence of hot gases; and the burning will be restricted to the desired burning surface which is left uncoated.

A composition for the restricting material that has been found eminently satisfactory for this purpose comprises a thermoplastic mixture containing from 70% to 80% by weight of polyamide resin formed by polymerizing the reaction product of dimerized and trimerized linoleic or linolenic acid with ethylene diamine and from 20% to 30% by weight of a non-drying alkyd resin, which is preferably modified as indicated below. In a preferred composition the restricting material comprises a mixture containing approximately 75% by weight of the polyamide resin and about 25% by weight of the non-drying alkyd resin.

The preferred alkyd resin is a glycerol sebacate modified by a fatty acid such as stearic, palmitic and lauric acids, aliphatic acids of low degree of unsaturation such as maleic, fumaric, crotonic, oleic, isocrotonic, acrylic, angelic, tiglic, or with natural non-drying oils such as castor, coconut or cottonseed oils. Other forms of thermoplastic non-drying, alkyd resins which are suitable for this purpose are: The condensation product of phthalic anhydride maleic acid and glycerol; a resin comprising a modified condensation product of adipic acid and a polyhydric alcohol, preferably glycerol; and a condensation product formed by condensing maleic anhydride with terpenine and castor oil. Castor oil is principally the glycerol ester of ricinoleic acid.

The saturated or unsaturated acids and the natural oils mentioned as modifiers serve principally as plasticizers for the alkyd resin. Under proper conditions some of these modifiers containing double bonds in the molecule may have slow-drying properties helping to form a more solid, dense, liner. Such a restricting composition must be compatible with the resinous material employed in compounding the propellant and when applied must adhere tightly to the surfaces of the cured alkyd resin base propellant.

The restricting liner material should be heated before it is ready for application to the propellant charge; and the best temperature to which it should be heated lies between 360° F. and 400° F., the optimum temperature range being between 385° F. and 395° F. If the lining material is allowed to become heated above 400° F. the resins in the mixture are apt to react with each other and form compounds which are not satisfactory for liners.

Figure 2:
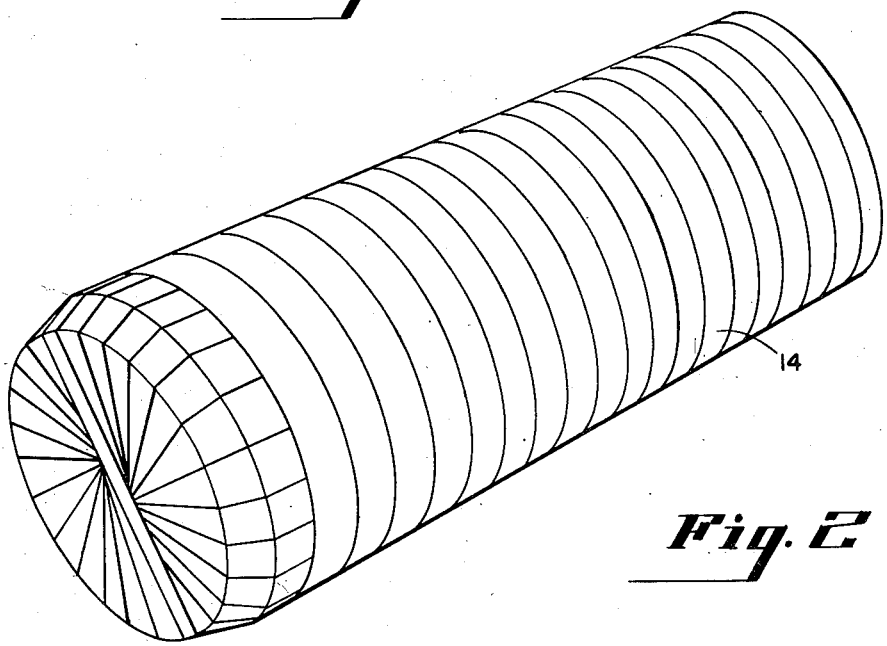

A physical embodiment of the invention is shown in the attached drawing of which:

Fig. 1 shows in longitudinal cross section a propellant charge restricted with a liner according to this invention; and Fig. 2 is an isometric view showing the liner of Fig. 1 with an added coating of tape to protect the outer surface of the liner.

The charge shown in Fig. 1 comprises a propellant charge 11, or grain as it is commonly called, of a conventional cylindrical form. When the charge is of the alkyd-vinyl resin and perchlorate type a suitable composition is as follows:

| | Percent by weight |
|---|---|
| Alkyd styrene heteropolymer | 73.00 |
| Alkali metal perchlorate | 26.85 |
| Peroxide catalyst | 0.15 |
| Total | 100.00 |

According to this invention the charge is protected by a thermoplastic layer 12 intimately bonded to the surface of charge 11. Although only the single layer 12 may often be sufficient, improvement is had by a second layer, and such a second layer is shown as the thermoplastic substance 13, made to adhere to the surface of the liner 12, by a second dipping.

Fig. 2 shows the coated propellant charge of Fig. 1 protected from abrasion by a confining wrapping of adhesive tape 14 such as cloth tape, glass tape, etc.

A method by which the liner may be applied to the propellant grain is as follows:

The propellant grain may be supported on a convenient dipping means such as a platform and lowered into a mixture of polyamide resin and modified alkyd resin which has been previously heated to a temperature somewhere between 360° F. and 400° F. The cold propellant grain immersed in the hot resin mixture is allowed to remain in the bath until a layer of the desired thickness has been deposited upon the surface. The grain is then removed from the bath and permitted to cool to ambient temperature. The second liner closely adhering to the first one may be formed on the propellant grain by redipping the grain which has already been cooled once, into the thermoplastic resin bath until the liner has reached the desired thickness. The grain is then removed from the bath and permitted to cool.

An important attribute of the liner of this invention is that it adheres tenaciously to the propellant surface, even when the propellant is of the alkyd-vinyl resin and perchlorate type; and it possesses a hard, flexible surface, and sufficient tensile strength to prevent it from abrading easily. Another of its attributes is its high melting point accompanied by very low thermal conductivity.

The liner material, furthermore, is impervious to the effect of hot gases encountered within the reaction chamber. This permits restricted burning to take place on the desired surface of the propellant charge during the entire run.

We claim:

1. A liner for a thermosetting alkyd-vinyl resin and inorganic perchlorate type of charge comprising a mixture of polyamide resins composed of the polymerization products of ethylene diamine with an acid selected from the group consisting of linoleic and linolenic acids and a non-drying modified alkyd resin comprising condensation products of polycarboxylic acid and polyhydric alcohol modified by a substance selected from the group consisting of saturated fatty acids, acids of low degree of unsaturation and non-drying vegetable oils.

2. A liner for a thermosetting alkyd-vinyl resin and inorganic perchlorate type of charge comprising a mixture of polyamide resins composed of the polymerization products of ethylene diamine with an acid selected from the group consisting of linoleic and linolenic acids and a non-drying modified alkyd resin comprising condensation products of polycarboxylic acid and glycerol modified by a substance selected from the group consisting of saturated fatty acids, maleic acid and non-drying vegetable oils.

3. A liner for a thermosetting alkyd-vinyl resin and inorganic perchlorate type of charge comprising a mixture of 70% to 80% by weight of polyamide resin composed of the polymerization products of ethylene diamine with an acid selected from the group consisting of linoleic and linolenic acids and 20% to 30% by weight of a non-drying modified alkyd resin comprising condensation products of polycarboxylic acid and polyhydric alcohol modified by a substance selected from the group consisting of saturated fatty acids, acids of low degree of unsaturation and non-drying vegetable oils.

4. A liner for a thermosetting alkyd-vinyl resin and inorganic perchlorate type of charge comprising a mixture of 70% to 80% by weight of polyamide resin composed of the polymerization products of ethylene diamine with an acid selected from the group consisting of linoleic and linolenic acids and 20% to 30% by weight of a non-drying modified alkyd resin comprising condensation products of polycarboxylic acid and glycerol modified by a substance selected from the group consisting of saturated fatty acids, acids with low degree of unsaturation and non-drying vegetable oils.

5. A propellant restricting liner for a thermosetting alkyd-vinyl resin and inorganic perchlorate charge comprising a mixture of approximately 75% by weight of a polyamide resin composed of the polymerization products of ethylene diamine with an acid selected from the group consisting of linoleic and linolenic acids and 25% by weight of a non-drying modified alkyd resin comprising condensation products of polycarboxylic acid and polyhydric alcohol modified by a substance selected from the group consisting of saturated fatty acids, acids of low degree of unsaturation and non-drying vegetable oils.

6. A propellant restricting liner for a thermosetting alkyd-vinyl resin and inorganic perchlorate charge comprising a mixture of polyamide resin composed of the polymerization products of ethylene diamine with an acid selected from the group consisting of linoleic and linolenic acids and glycerol sebacate modified with a compound selected from the group consisting of saturated fatty acids, acids of a low degree of unsaturation and non-drying vegetable oils.

7. A propellant restricting liner for a thermosetting alkyd-vinyl resin and inorganic perchlorate charge comprising a mixture of polyamide resin composed of the polymerization products of ethylene diamine with an acid selected from the group consisting of linoleic and linolenic acids and glycerol sebacate modified with castor oil.

8. A liner for a thermosetting alkyd-vinyl resin and inorganic perchlorate charge comprising a thermoplastic mixture of a polyamide resin composed of the polymerization products of ethylene diamine with an acid from a group consisting of linoleic and linolenic acids and a non-drying modified alkyd resin comprising the condensation product formed by condensing phthalic anhydride maleic acid and glycerol.

9. A liner for a thermosetting alkyd-vinyl resin and inorganic perchlorate charge comprising a thermoplastic mixture of a polyamide resin composed of the polymerization products of ethylene diamine with an acid from a group consisting of linoleic and linolenic acids and the condensation product formed by condensing adipic acid with glycerol and modifying the resulting resin from a compound selected from the group consisting of saturated fatty acids, acids of a low degree of unsaturation and non-drying vegetable oils.

(References on following page)

References Cited in the file of this patent

UNITED STATES PATENTS

| | | |
|---|---|---|
| 1,944,886 | Goessmann | Jan. 30, 1934 |
| 2,269,185 | Dawson | Jan. 6, 1942 |
| 2,287,986 | Gowing et al. | June 30, 1942 |
| 2,389,837 | Bogin | Nov. 27, 1945 |

FOREIGN PATENTS

| | | |
|---|---|---|
| 26,430 | Great Britain | Nov. 29, 1907 |
| 502,560 | France | Feb. 24, 1920 |
| 248,089 | Great Britain | Mar. 1, 1926 |

OTHER REFERENCES

"Astronautics," vol. 19, p. 6, May 1932.